UNITED STATES PATENT OFFICE.

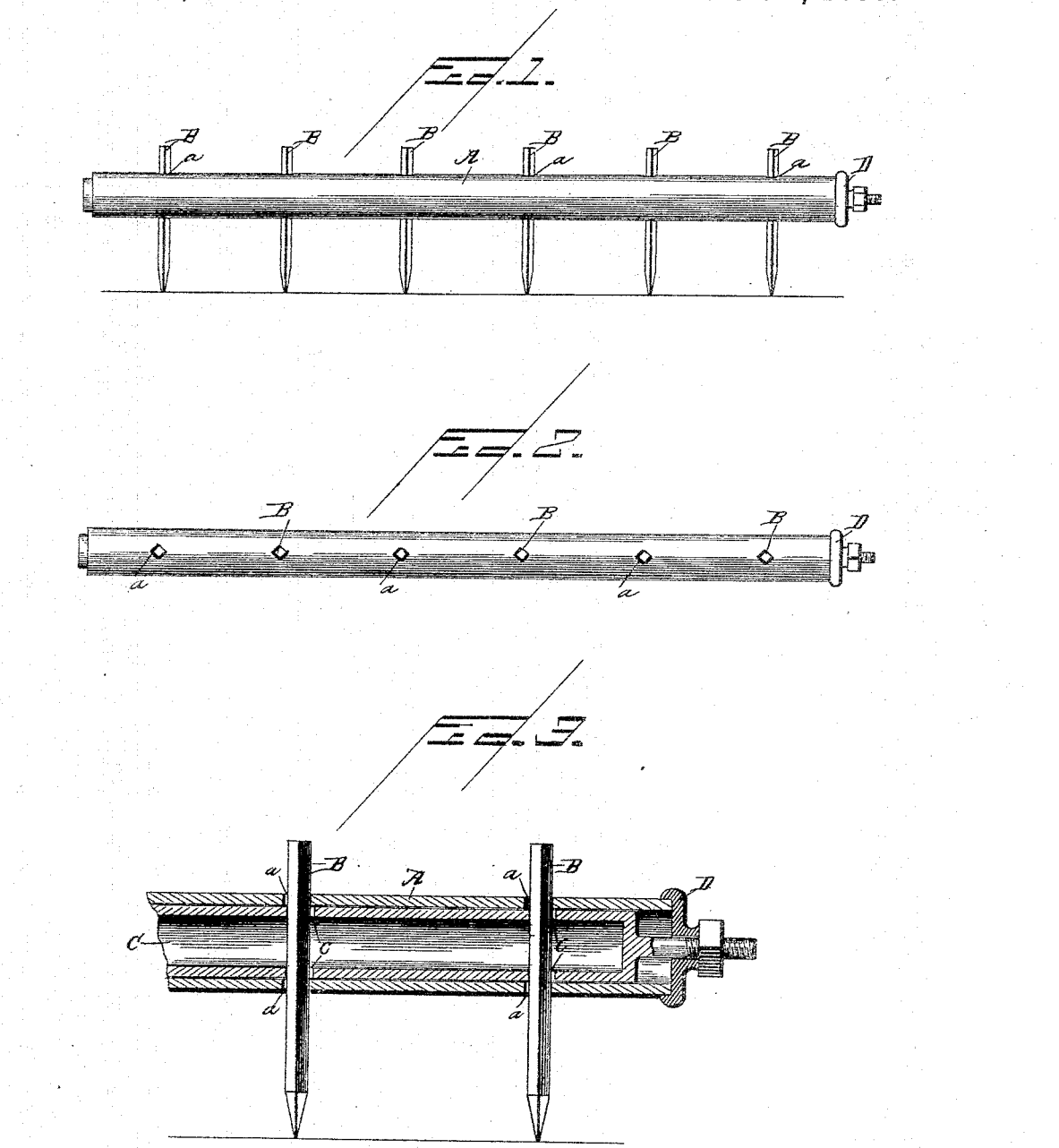

JAMES GARDNER STOWE, OF KANSAS CITY, MISSOURI.

DEVICE FOR HOLDING HARROW-TEETH.

SPECIFICATION forming part of Letters Patent No. 491,297, dated February 7, 1893.

Application filed September 12, 1892. Serial No. 445,623. (No model.)

*To all whom it may concern:*

Be it known that I, JAMES GARDNER STOWE, of Kansas City, Jackson county, Missouri, have invented certain new and useful Improvements in Devices for Holding Harrow-Teeth, of which the following is a full, clear, and exact description, reference being had to the accompanying drawings, forming a part hereof.

My invention relates to an improved device for holding harrow teeth in place upon the bar, and the object of my invention is to provide a simple, inexpensive and effective device for effecting this purpose which will securely hold all the teeth by means of simple instrumentalities and which will not get out of order or suffer from exposure to the weather. This I accomplish by placing two tubular bars one within the other and perforating them to register one within the other to receive the teeth, and securing the tubes together, so that one may be drawn within the other and clamped together, as will hereinafter appear with reference to the accompanying drawings, wherein:

Figure 1 is a side elevation of a harrow tooth bar with the teeth secured therein. Fig. 2 a plan of the same. Fig. 3 an enlarged sectional elevation of one end of a bar showing two of the teeth and my improved means for holding them in place.

A tubular bar A of ordinary gas pipe and having holes $a$ bored at regular intervals, and harrow teeth B of usual form, diamond shape or rectangular in cross section passing diametrically through the tube B and held in place by means of a smaller tube C fitted within the tubular bar A and also bored at regular intervals with holes $c$ which accurately register with the holes in the bar B, through which the teeth B also pass and are securely clamped and held together upon the bar by the endwise movement of one tube within the other. This movement is effected and the tubes are then held securely to clamp the teeth between them by means of a clamping head at one end of the bar preferably consisting of a cap D having an inwardly extending flange at its outer margin, the body of the cap fitting against the end of the outer tube, and the inwardly extending flange fitting around and inclosing the end of the outer tube A and centrally bored to receive a screw bolt cast upon or otherwise secured to the end of the inner tube and a screw nut fitted upon the end of said bolt to bear upon the outer face of the cap D and draw the inner tube toward the cap end of the outer tube with any force necessary to securely clamp the teeth. As the teeth are angular and the openings in the outer bar are also angular and somewhat larger than the teeth, the elasticity of the tooth will be sufficient to yield between the upper and lower binding surfaces and bring them all together. The end cap and bolt for holding the tubes together is the preferred form of construction as it is simple, durable and inexpensive.

What I claim as new and desire to secure by Letters Patent:—is

A harrow-tooth bar, comprising an exterior tube having perforations therethrough, an interior tube having a closed end and a longitudinally extending screw-threaded projection, and also provided with perforations, said perforations of each tube being adapted to register with each other, a flanged cap fitting against and around the end of the outer tube and provided with a central opening or bore through which the screw-threaded projection passes, and a clamping nut, engaging the screw-threaded projection, and bearing against the outer side of the flanged cap, substantially as set forth.

In testimony whereof I affix my signature in the presence of two witnesses.

JAMES GARDNER STOWE.

Witnesses:
MAUD FITZPATRICK,
M. R. REMLEY.